United States Patent
Nam et al.

(10) Patent No.: US 12,464,538 B2
(45) Date of Patent: Nov. 4, 2025

(54) GROUP-BASED PDCCH OVERBOOKING AND DROPPING

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 18/052,436

(22) Filed: Nov. 3, 2022

(65) Prior Publication Data

US 2023/0141557 A1  May 11, 2023

Related U.S. Application Data

(60) Provisional application No. 63/276,514, filed on Nov. 5, 2021.

(51) Int. Cl.
*H04W 72/232* (2023.01)
*H04W 72/0446* (2023.01)
*H04W 72/56* (2023.01)
*H04W 74/0833* (2024.01)

(52) U.S. Cl.
CPC ..... *H04W 72/232* (2023.01); *H04W 72/0446* (2013.01); *H04W 72/56* (2023.01); *H04W 74/0833* (2013.01)

(58) Field of Classification Search
CPC ........... H04W 72/0446; H04W 72/232; H04W 72/56; H04L 5/0094
See application file for complete search history.

(56) References Cited

U.S. PATENT DOCUMENTS

| | | | |
|---|---|---|---|
| 2020/0045569 A1* | 2/2020 | Seo | H04W 72/23 |
| 2020/0221428 A1* | 7/2020 | Moon | H04B 7/088 |
| 2023/0117189 A1* | 4/2023 | Kim | H04L 1/0038 370/329 |
| 2023/0171828 A1* | 6/2023 | Wang | H04W 52/367 370/329 |

* cited by examiner

*Primary Examiner* — Sulaiman Nooristany
(74) *Attorney, Agent, or Firm* — Patterson+ Sheridan, L.L.P.

(57) ABSTRACT

Aspects of the present disclosure relate to wireless communications, and more particularly, to techniques for group-based physical downlink control channel (PDCCH) overbooking and dropping. One aspect provides a method for wireless communications by a user equipment (UE). The method generally includes: determining a total number of slots for physical downlink control channel (PDCCH) monitoring for a slot group is larger than a maximum number of monitored slots for the UE for the slot group; and, in response to the determination that the total number of slots for PDCCH monitoring is larger than the maximum number of monitored slots for the UE for the slot group, dropping a first group of search space (SS) sets, wherein the first group of SS sets is selected based on a priority of the first group of SS sets relative to other groups of SS sets.

26 Claims, 10 Drawing Sheets

900

902

Determine a total number of slots configured for physical downlink control channel (PDCCH) monitoring for a slot group is larger than a maximum number of monitored slots for the UE for the slot group

904

In response to the determination that the total number of slots configured for PDCCH monitoring is larger than the maximum number of monitored slots for the UE for the slot group, drop a first group of search space (SS) sets, wherein the first group of search space (SS)sets is selected based on a priority of the first group of SS sets relative to other groups of SS sets

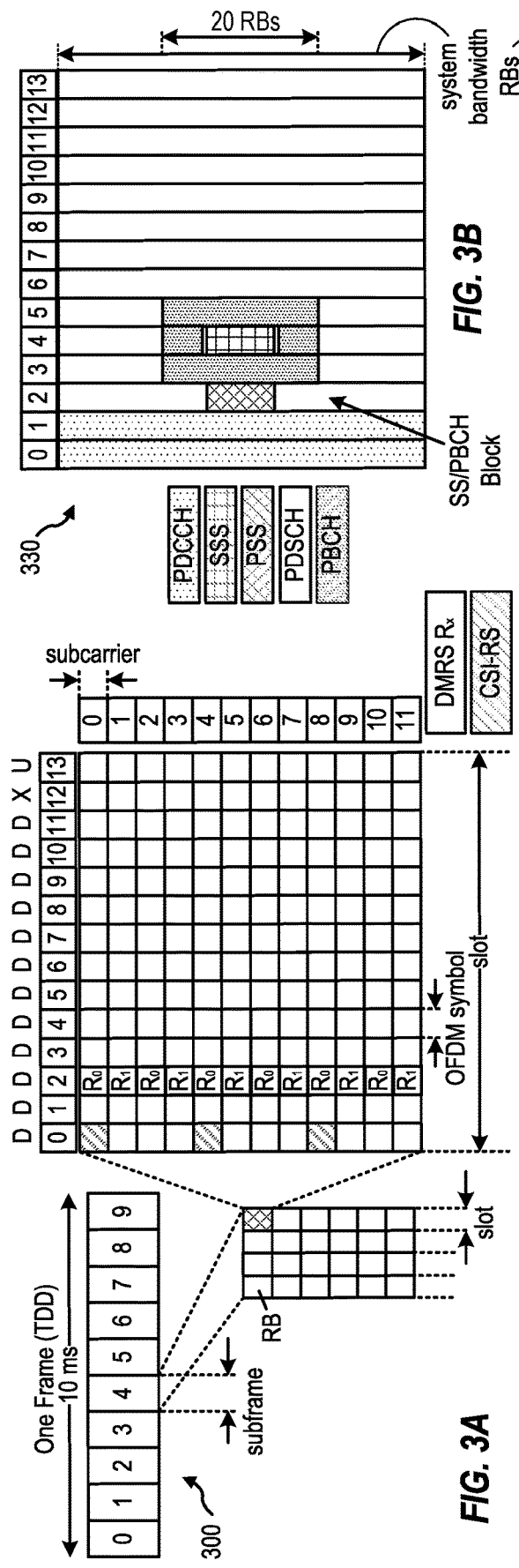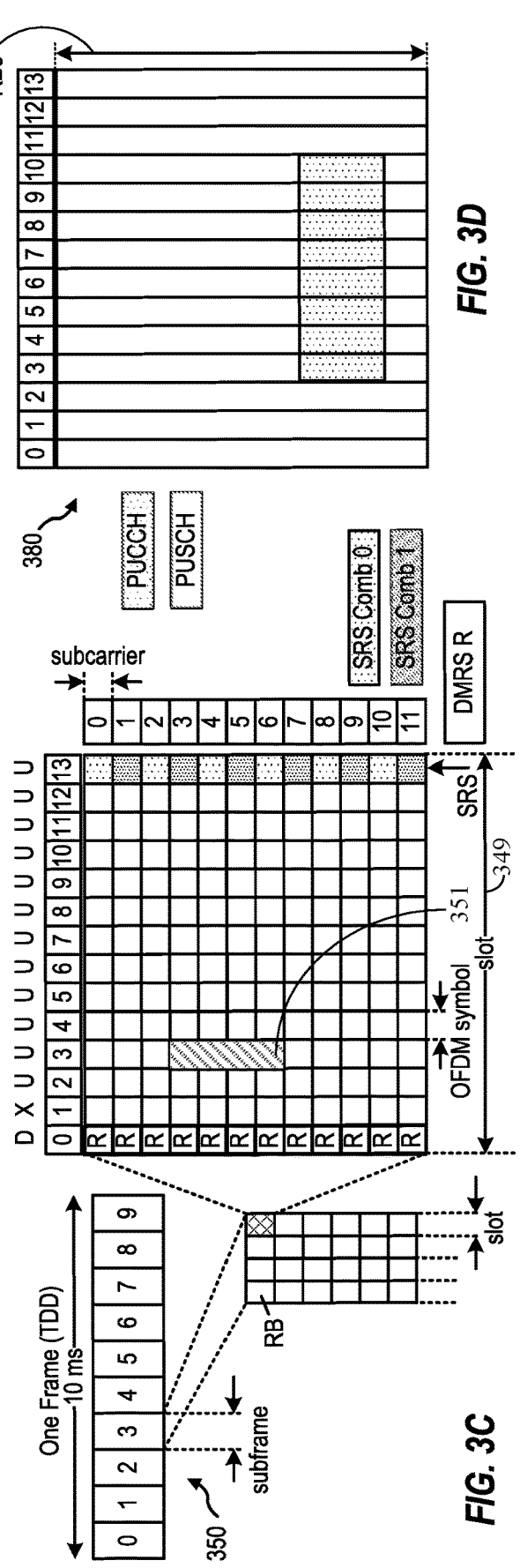

(a) Micro-sleep with cross-slot scheduling
(b) Micro-sleep w/o cross-slot scheduling

GROUP-BASED PDCCH OVERBOOKING AND DROPPING

CROSS REFERENCE TO RELATED APPLICATIONS

This application claims benefits of and priority to U.S. Provisional Patent Application No. 63/276,514, filed on Nov. 5, 2021, which is assigned to the assignee hereof and herein incorporated by reference in the entirety as if fully set forth below and for all applicable purposes.

INTRODUCTION

Aspects of the present disclosure relate to wireless communications, and more particularly, to techniques for group-based physical downlink control channel (PDCCH) overbooking and dropping.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect of the present disclosure provides a method for wireless communication by a user equipment (UE). The method generally includes: determining a total number of slots configured for physical downlink control channel (PDCCH) monitoring for a slot group is larger than a maximum number of monitored slots for the UE for the slot group; and, in response to the determination that the total number of slots configured for PDCCH monitoring is larger than the maximum number of monitored slots for the UE for the slot group, dropping a first group of search space (SS) sets, wherein the first group of search space (SS) sets is selected based on a priority of the first group of SS sets relative to other groups of SS sets.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Aspects of the present disclosure provide apparatuses, methods, processing systems, and computer-readable mediums for group-based physical downlink control channel (PDCCH) overbooking and dropping.

For NR applications with higher carrier frequencies (e.g., 52.6 GHz-71 GHz), an OFDM waveform with a very large subcarrier spacing (480 kHz or 960 kHz) may be desirable to combat severe phase noise and to fill up the larger bandwidth (~2 GHz) available on the higher carrier frequencies. Due to the large subcarrier spacing, the slot length tends to be very short. Because a UE uses blind decoding (BD) in receiving physical downlink control channels (PDCCHs), and BD is power intensive for the UE, the number of BD attempts a UE is expected to perform is limited. UEs in Rel-15 communications use per-slot PDCCH monitoring to count and limit their number of BD attempts. UEs in Rel-16 communications system use per-span PDCCH monitoring to count and limit their number of BD attempts. It may be desirable to not use per-slot PDCCH monitoring (as in Rel-15) or per-span PDCCH monitoring (as in Rel-16) for larger SCS, because the number of PDCCH candidates and non-overlapped CCEs for the per-slot PDCCH monitoring capability would be very small, thus, limiting the scheduling flexibility. Additionally, due to the short slot length implied by larger SCS, micro-sleep opportunities for UEs may be reduced and, thus, the power efficiency of the UEs may be degraded.

Thus, a new PDCCH monitoring capability defined over a group of multiple slots may be desirable for large SCS communication systems. In aspects of the present disclosure, the "time unit" for counting the maximum number of PDCCH candidates and non-overlapped CCEs may be a group of slots. PDCCH monitoring occasions (MOs) dispersed over multiple slots may be challenging for UEs to monitor, due to short slot length, and more concentrated MOs may be preferred for some UE implementations. Hence, within a slot group, if the total number of slots configured for PDCCH monitoring is large, it may be desirable for a UE to drop some of the MOs (that is, fail to monitor those MOs) in order to reduce the number of slots that are actually monitored for PDCCH.

Aspects of the present disclosure thus provide rules for a UE to follow to determine which PDCCH MOs may be dropped, in order for UE behavior to be predictable for network entities and to improve reliability of communications to UEs.

Introduction to Wireless Communication Networks

Figure 1:
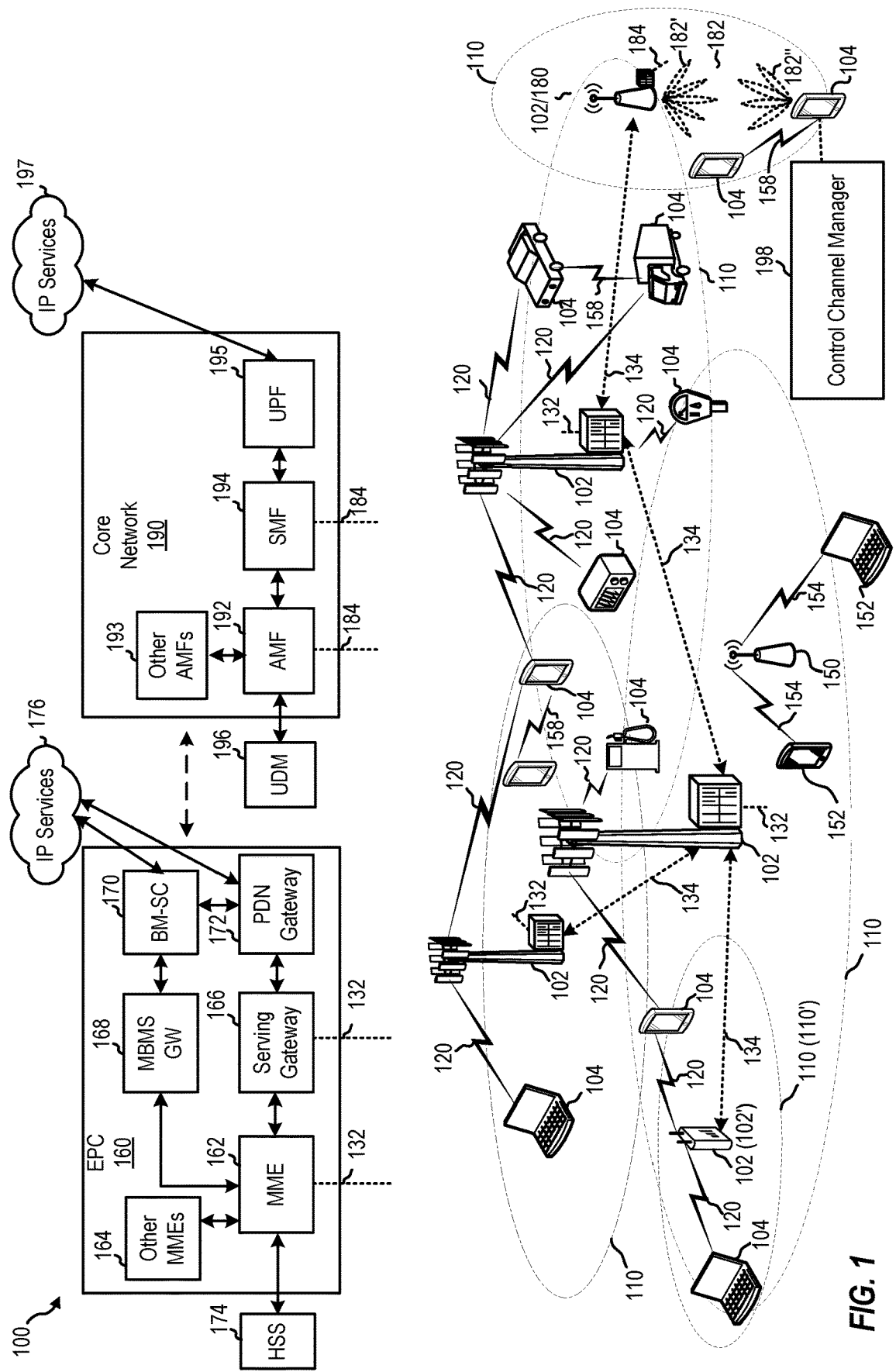
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102 (which may also be referred to herein as access node (AN) 102), user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 9:
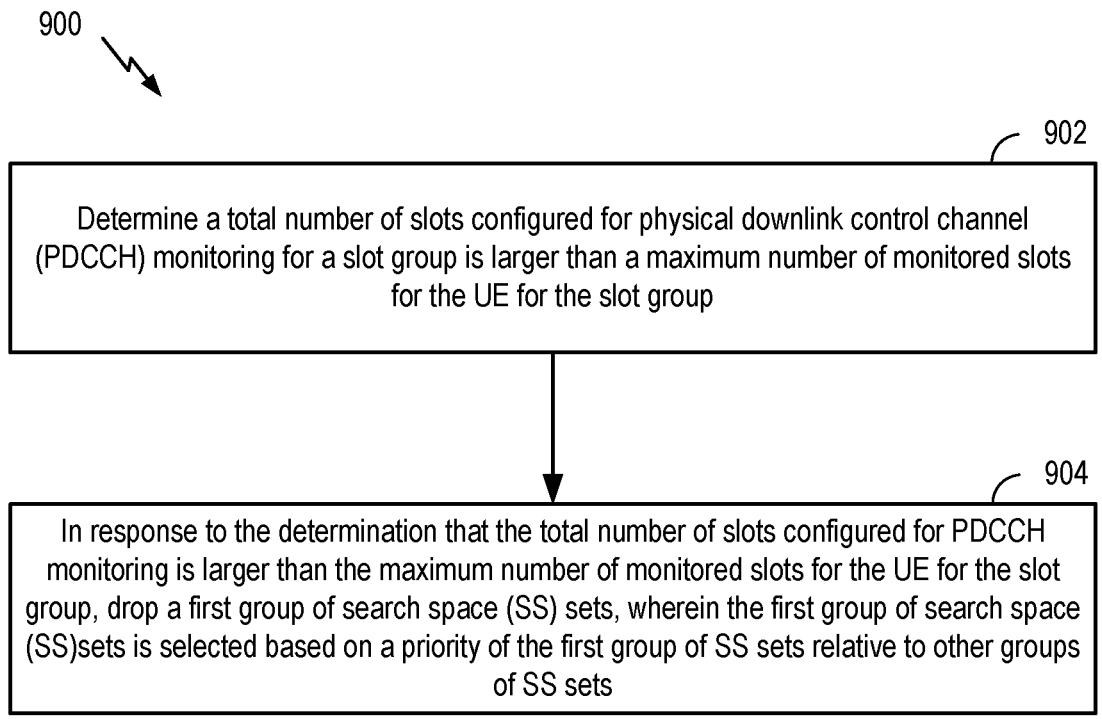
FIG. 9 illustrates example operations for wireless communication by a user equipment (UE), in accordance with certain aspects of the present disclosure.

UE 104 includes a control channel manager 198, which may configure the UE to perform operations 900 of FIG. 9.

Figure 2:
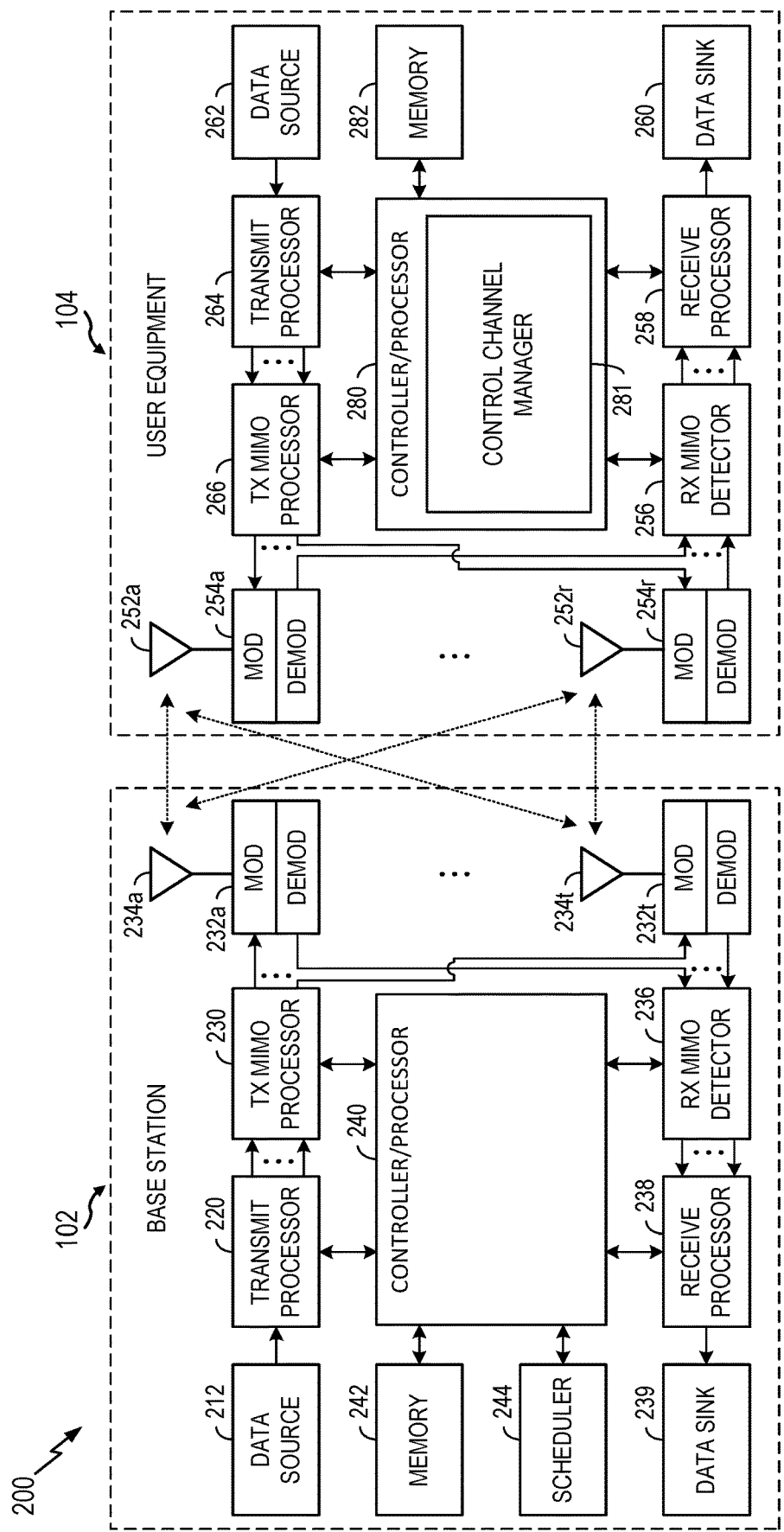
FIG. 2 is a block diagram conceptually illustrating aspects of an example base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively antennas 234), transceivers 232a-t (collectively transceivers 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications.

Generally, user equipment 104 includes various processors (e.g., 258, 264, 266, and 280), antennas 252a-r (collectively antennas 252), transceivers 254a-r (collectively transceivers 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes control channel manager 281, which may be representative of control channel manager 198 of FIG. 1. Notably, while depicted as an aspect of controller/processor 280, control channel manager 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe. In some aspects, UEs may be configured to communicate (e.g., via SL communications) using the frame format described with respect to diagrams 300, 330, 350, 380. A radio frame (e.g., as shown in diagram 300) may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS, during which SL communication may occur. Further discussions regarding FIG. 1, FIG. 2, and FIGS. 3A-3D are provided later in this disclosure.

As noted above, the techniques presented herein may be applied in various bands utilized for NR (5G) and future systems (e.g., 5G+, 6G, and beyond). For example, the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 µSec, while in FR4 with 960 kHz, the slot length is 15.6 µSec. In some cases, a frequency band referred to as FR2×may be used. The techniques may also be applied in the FR1 band (4.1 GHz to 7.125 GHz), for example, may be used for channel state information (CSI) feedback, control messages, or on control plane signaling.

Figure 4:
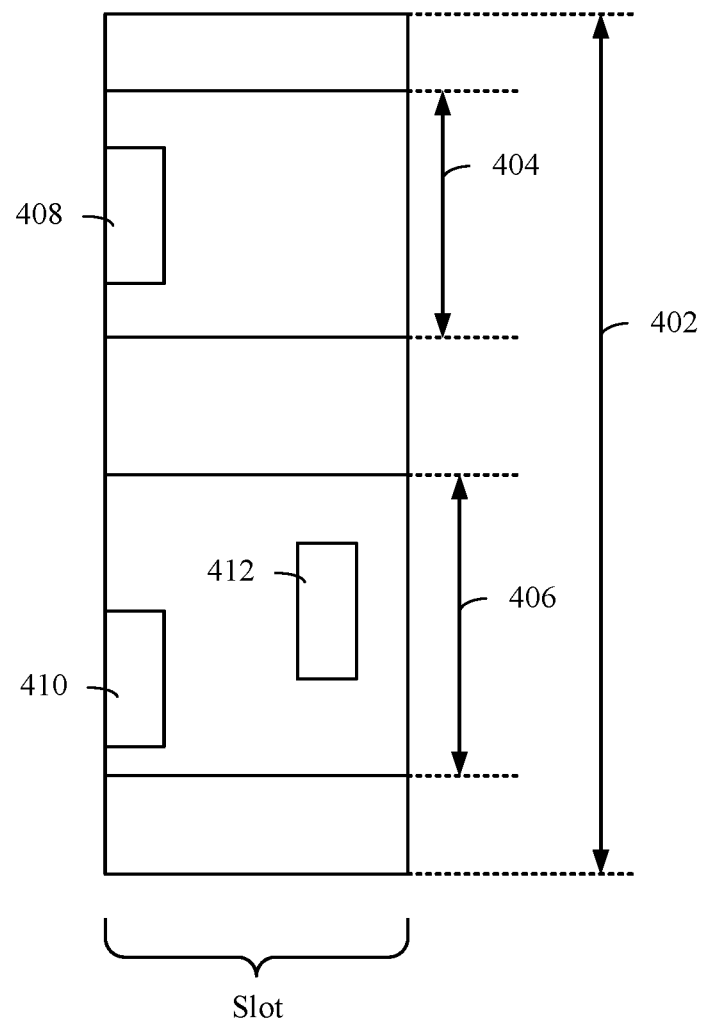
FIG. 4 is a diagram illustrating an example of control resource sets (CORESETs) within a carrier bandwidth across a slot in NR, in accordance with certain aspects of the present disclosure.

In certain wireless communication systems (e.g., LTE), the PDCCH is allocated across an entire system bandwidth, whereas an NR PDCCH is transmitted in the control resource sets (CORESETs) of an active bandwidth part (BWP). FIG. 4 is a diagram illustrating an example of control resource sets (CORESETs) within a carrier bandwidth across a slot in NR. As shown, a carrier bandwidth (CBW) 402 may have multiple bandwidth parts (BWPs) 404, 406 at various subcarrier spacings (SCS). In this example, the BWP 404 is configured with a single CORESET 408. In aspects, a BWP may be configured with multiple CORESETs. For example, the BWP 406 is configured with two CORESETs 410, 412. Each of the CORESETs 408, 410, 412 include a set of physical resources within a specific area in a downlink resource grid and are used, for example, to carry downlink control information (DCI), system information, paging information, and/or random access responses (RARs). In a CORESET, the set of resource blocks (RBs) and the number of consecutive OFDM symbols in which the CORESET is located are configurable with a CORESET configuration, and the time domain location of the OFDM symbols is configurable with corresponding PDCCH search space (SS) set(s). A search space set may be configured with a specific type (e.g., common search space (CSS) set or a UE-specific search space (USS) set), a DCI format to be monitored, a monitoring occasion, and the number of PDCCH candidates for each aggregation level (AL) in the SS set. In other words, a search space set is a set of one or more search spaces, where each search space corresponds to an AL (e.g., the number of control channel elements for a PDCCH candidate). The configuration flexibilities of control regions (e.g., CORESETs and associated search space sets) including time, frequency, numerologies, and operating points enable NR to address a wide range of use cases for control signaling (e.g., various desired latencies and/or various channel conditions).

Example PDCCH Monitoring

In Rel-15 NR communications systems, a UE's capability for PDCCH monitoring is defined as a function of subcarrier spacing (SCS) of the BWP which the UE is monitoring. In general, the capability reduces with higher SCS. Since the number of slots per unit time also increases with higher SCS, the total capability per unit time does not decrease as SCS increases.

Table 1 below shows the maximum number of monitored PDCCH candidates per slot for a downlink (DL) bandwidth part (BWP) with SCS configuration µ selected from {0, 1, 2, 3} (equivalent to SCS of 15 kHz, 30 kHz, 60 kHz, and 120 kHz, respectively) for a single serving cell.

TABLE 1

| µ | Maximum number of monitored PDCCH candidates per slot and per serving cell |
|---|---|
| 0 | 44 |
| 1 | 36 |
| 2 | 22 |
| 3 | 20 |

Table 2 below shows the maximum number of non-overlapped control channel elements (CCEs) per slot for a downlink (DL) bandwidth part (BWP) with SCS configuration µ selected from {0, 1, 2, 3} for a single serving cell.

TABLE 2

| µ | Maximum number of non-overlapped CCEs per slot and per serving cell |
|---|---|
| 0 | 56 |
| 1 | 56 |
| 2 | 48 |
| 3 | 32 |

In Rel-16 communications systems, in order to support mini-slot based scheduling, span based UE PDCCH monitoring capability is introduced for 15 kHz and 30 kHz SCS.

The capability is defined by a pair (X, Y), where X is the minimum distance in symbols between the two PDCCH monitoring occasions' starting symbol, and Y is the maximum number of PDCCH symbols in a span. Thus, for the below sets of (X, Y) values:
- (2, 2) can support monitoring for a PDCCH during each set of 2 symbols, with monitoring occurring 7 times in each slot;
- (4, 3) can support monitoring for a PDCCH during each set of 4 symbols, with monitoring occurring 3 times in each slot; and
- (7, 3) can support monitoring for a PDCCH during each set of 7 symbols, with monitoring occurring 2 times in each slot.

Table 3 below shows the maximum number of monitored PDCCH candidates in a span for the indicated combinations (X, Y) for a DL BWP with SCS configuration p selected from {0, 1} for a serving cell.

TABLE 3

| | Maximum number of monitored PDCCH candidates per span for combination (X, Y) and per serving cell | | |
|---|---|---|---|
| µ | (2, 2) | (4, 3) | (7, 3) |
| 0 | 14 | 28 | 44 |
| 1 | 12 | 24 | 36 |

Table 4 below shows the maximum number of non-overlapped CCEs in a span for combination (X, Y) for a DL BWP with SCS configuration µ selected from {0, 1} for a single serving cell.

TABLE 4

| | Maximum number of non-overlapped CCEs per span for | | |
|---|---|---|---|
| μ | (2, 2) | (4, 3) | (7, 3) |
| 0 | 18 | 36 | 56 |
| 1 | 18 | 36 | 56 |

Examples of Rel-15 and Rel-16 PDCCH monitoring capabilities for µ=1 and two PDCCH MOs per slot for two cases of monitoring occasion (MO) configuration may be as follows. In the first case (Case 1) for each of Rel-15 and Rel-16, each MO is configured with 18 PDCCH candidates. In the second case (Case 2) for each of Rel-15 and Rel-16, each MO is configured with 20 PDCCH candidates.

In a Rel-15 communications system, a UE's monitoring capability for µ=1 is limited to 36 candidates per slot and per serving cell (see Table 1, above). Thus, in case 1, for each slot, the UE monitors a total of 36 candidates; 18 in the first MO and 18 in the second MO. In case 2, for each slot, the UE monitors total 20 candidates only in the first MO and skips or drops the second MO, because if the UE monitored the second MO, the UE would monitor a total of 40 candidates, which exceeds the limit of 36 candidates (see Table 1, above).

Figure 5:
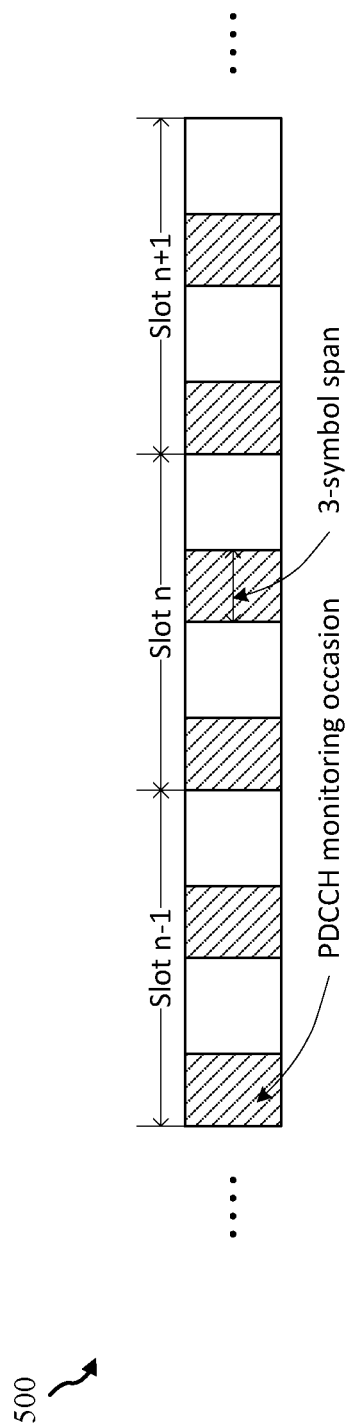
FIG. 5 is a timeline showing PDCCH monitoring by a UE, in accordance with certain aspects of the present disclosure.

FIG. 5 is a timeline 500 showing PDCCH monitoring by a UE (e.g., UE 104, shown in FIGS. 1-2) operating in a Rel-16 communications system with monitoring capability (7, 3), according to aspects of the present disclosure. As illustrated, in each slot there are two MOs having length of 3 symbols, and the first symbol of each MO occurs 7 symbols after the first symbol of a preceding MO.

In a Rel-16 communications system, a UE's monitoring capability for µ=1 is limited to 36 candidates per span and per serving cell for the combination (7, 3) (see Table 3, above). Thus, in case 1, for each slot, the UE monitors a total of 36 candidates; 18 in the first MO and 18 in the second MO. In case 2, for each slot, the UE monitors a total of 40 candidates; 20 in the first MO and 20 in the second MO. It may be noted that the 20 in each 3-symbol span of each MO is less than the limit of 36 candidates per span per serving cell for the combination (7, 3) (see Table 3, above).

For NR applications with higher carrier frequencies (e.g., 52.6 GHz-71 GHz), an OFDM waveform with a very large subcarrier spacing (480 kHz or 960 kHz) may be desirable to combat severe phase noise and to fill up the larger bandwidth (~2 GHz) available on the higher carrier frequencies. Due to the large subcarrier spacing, the slot length tends to be very short. For example, with a 120 kHz SCS, the slot length is 125 µSec, while, with a 960 kHz SCS, the slot length is 15.6 µSec.

It may be desirable to not use per-slot PDCCH monitoring, (as in Rel-15) for larger SCS, because the number of PDCCH candidates and non-overlapped CCEs for the per-slot PDCCH monitoring capability would be very small, thus, limiting the scheduling flexibility. Additionally, due to the short slot length implied by larger SCS, micro-sleep opportunities for UEs may be reduced and, thus, the power efficiency of the UEs may be degraded.

Figure 6A:
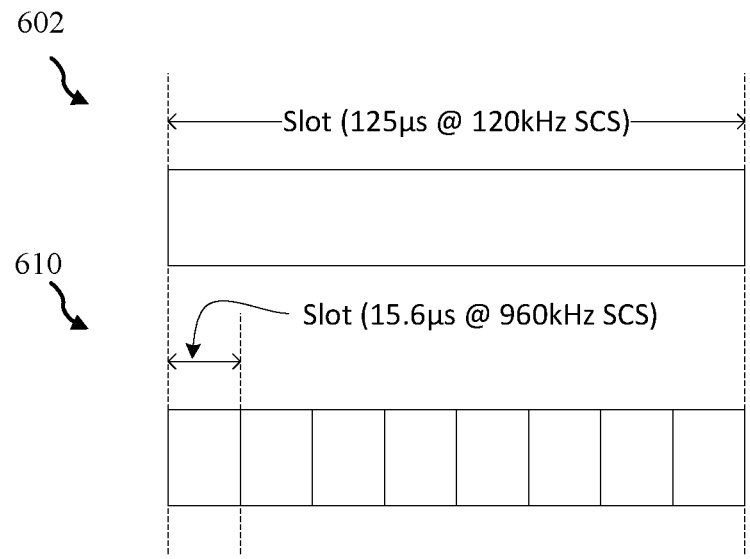
FIGS. 6A and 6B illustrate slot length and micro-sleep opportunities for UEs, in accordance with certain aspects of the present disclosure.

FIG. 6A illustrates slot length in a communications system using a 120 kHz SCS at 602. Slot length in a communications system using a 960 kHz SCS is shown at 610.

Figure 6B:
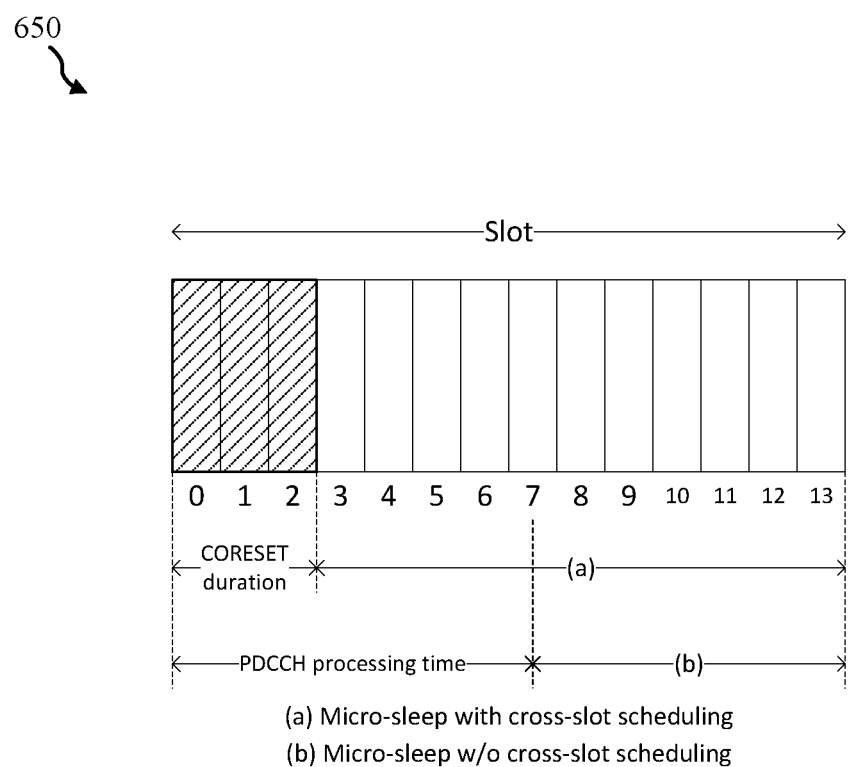

FIG. 6B illustrates the micro-sleep opportunities for RF chains of UEs (e.g., UE 104, shown in FIGS. 1-2) in a slot 650, according to aspects of the present disclosure. The illustrated micro-sleep opportunities increase, if the separation between two PDCCH monitoring occasions increases. Micro-sleep opportunities shorten for shorter separations between PDCCH MOs, because the short period of time to wake-up or put to sleep an RF chain does not vary with the SCS, while the length of each micro-sleep opportunity varies with the length of the slot, which varies with the SCS, as illustrated in FIG. 6A, discussed above.

In aspects of the present disclosure, there may be a maximum number of PDCCH candidates and non-overlapped CCEs a UE can monitor per "time unit" on the active DL BWP of a serving cell (see, e.g., TS 38.213). As discussed above, Rel-15 communications systems use a slot as the "time unit" (referred to herein as per-slot PDCCH monitoring). In per-slot PDCCH monitoring, a total number of PDCCH candidates and CCEs per slot matters. Also as discussed above, Rel-16 communications use a span of symbols as the "time unit" (referred to herein as per-span PDCCH monitoring). In per-span PDCCH monitoring, a total number of PDCCH candidates and CCEs per span (2 or 3 symbols) and the separation between spans matter.

According to aspects of the present disclosure, subcarrier spacing higher than 120 kHz (e.g., 480 kHz and 960 kHz) may be used for communications systems in higher frequency bands (e.g., 60 GHz carrier frequency). Due to the extremely short slot length with a higher SCS (see, e.g., FIG. 6A), per-slot and per-span PDCCH monitoring capabilities are challenging to implement. For example, for per-slot capability with a short slot length, the number of PDCCH candidates and CCEs may be extremely small and the scheduling flexibility and performance may be impacted. In another example, for per-span capability with a short slot length, the sub-slot separation between spans may be very hard to achieve.

Thus, a new PDCCH monitoring capability defined over a group of multiple slots may be desirable. In aspects of the present disclosure, the "time unit" for counting the maximum number of PDCCH candidates and non-overlapped CCEs may be a group of slots.

According to aspects of the present disclosure, multi-slot PDCCH monitoring (e.g., using a group of slots as the "time unit" for counting the maximum number of PDCCH candidates and non-overlapped CCEs) may be based on slots within a slot group. In such aspects, each slot group may consist of X consecutive slots. Additionally, slot groups may be consecutive and non-overlapping.

In aspects of the present disclosure, the start of the first slot group in a subframe may be aligned with the subframe boundary, and the start of each slot group may be aligned with a slot boundary.

It may be desirable for a UE to report a blind decoding (BD) or CCE budget for X=4 or 8 slots (for 480 kHz or 960 kHz SCS, respectively), if the UE supports the corresponding SCS. Similarly, it may be desirable for a UE to report a BD or CCE budget and is optional for X=2 or 4 slots (for 480 kHz or 960 kHz SCS, respectively).

According to aspects of the present disclosure, there may be a common BD budget for a UE for all search spaces.

In aspects of the present disclosure, search space (SS) sets may be grouped. For example, different types (e.g., Type 0/0A/1/2/3 common search space (CSS), UE-specific search space (USS)) of SS sets may be grouped separately.

An example grouping for SS sets may be:
Group 1: Type 1 CSS with dedicated RRC configuration and type 3 CSS, UE specific SS; and
Group 2: Type 1 CSS without dedicated RRC configuration and type 0, 0A, and 2 CSS.

In aspects of the present disclosure, all SS sets in Group k may be configured to be within a span of $Y_k$ consecutive slots in a slot group of X slots. The value of $Y_k$ may be determined based on the UE's capabilities, (e.g., BD capabilities). The position of $Y_k$ slots for different groups can be different; thus the positions of $Y_k$ slots for different groups may or may not overlap.

Figure 7:
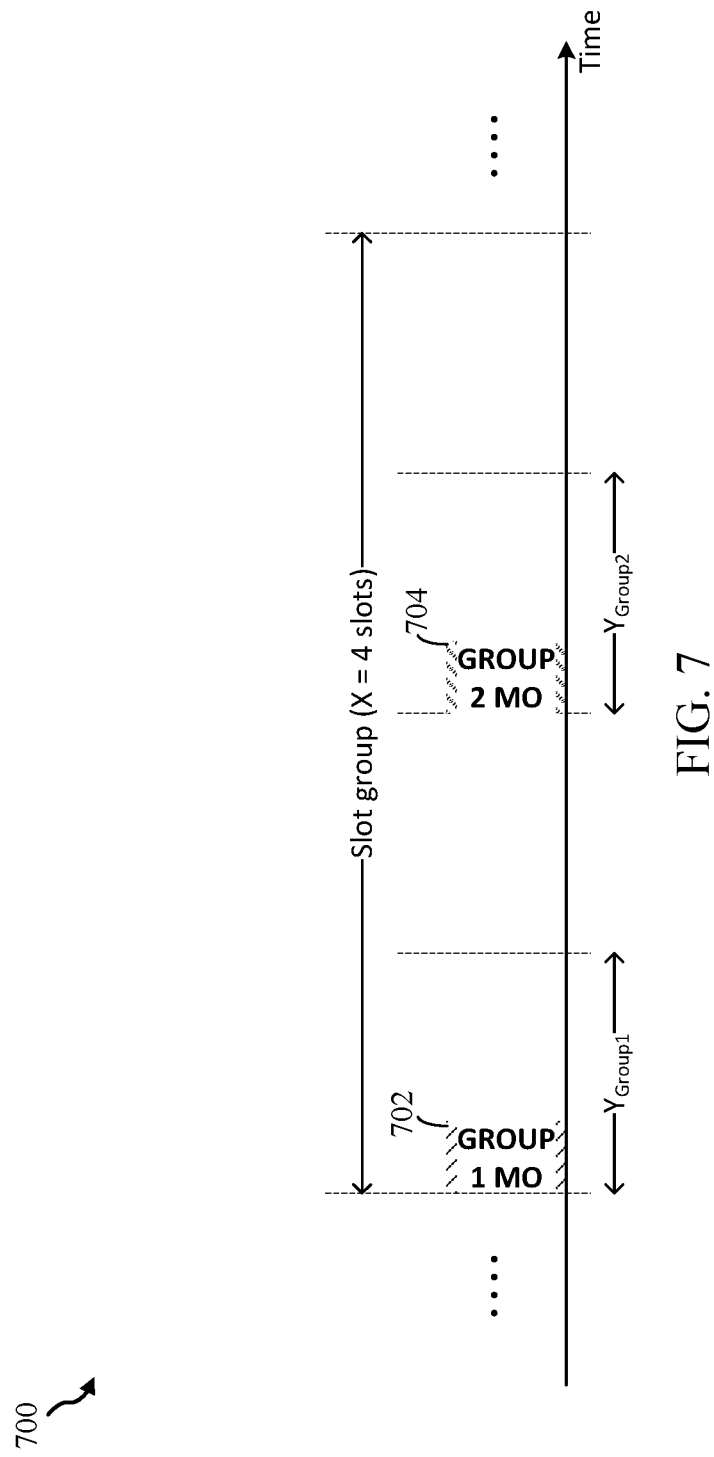
FIG. 7 illustrates an example set of monitoring opportunities (MOs) for a grouping of search space (SS) sets, in accordance with certain aspects of the present disclosure.

FIG. 7 illustrates an example set 700 of MOs for a grouping of SS sets, in accordance with aspects of the present disclosure. As illustrated, the example set 700 of MOs includes a first MO 702 for SS sets in Group 1 and a second MO 704 for SS sets in Group 2.

PDCCH monitoring occasions (MOs) dispersed over multiple slots may be challenging for UEs to monitor, due to short slot length, and more concentrated MOs may be preferred for some UE implementations. Hence, within a slot group, if the total number of slots configured for PDCCH monitoring is large, it may be desirable for a UE to drop some of the MOs (that is, fail to monitor those MOs) in order to reduce the number of slots that are actually monitored for PDCCH.

It is desirable to determine rules to determine which PDCCH MOs may be dropped, in order for UE behavior to be predictable for network entities and to improve reliability of communications to UEs.

Example Group-Based PDCCH Overbooking and Dropping

Aspects of the present disclosure provide apparatuses, methods, processing systems, and computer-readable mediums for group-based PDCCH overbooking and dropping.

In aspects of the present disclosure, a UE may implement group-based PDCCH overbooking for multi-slot PDCCH monitoring. The UE may utilize a set of rules to determine which groups of SS sets or MOs the UE drops (e.g., fails to monitor).

According to aspects of the present disclosure, a connected mode UE performing multi-slot PDCCH monitoring may determine a maximum number of monitored slots ($Y_{total}$) for PDCCH per slot group of X slots.

In aspects of the present disclosure, the number $Y_{total}$ may be determined based on UE capability (e.g., BD capability) or indicated by a BS serving the UE.

According to aspects of the present disclosure, when there are multiple groups of SS sets, configured on a UE, with span length $Y_k$, $Y_{total}$ may satisfy:

$$\min\left(X, \sum_k Y_k\right) \geq Y_{Total} \geq \max_k Y_k.$$

In aspects of the present disclosure, a UE implementing group-based PDCCH overbooking for multi-slot PDCCH monitoring may use a priority-based overbooking rule to determine which groups of SS sets or MOs to drop.

According to aspects of the present disclosure, for each group of SS sets among multiple groups of SS sets configured on a UE, a priority index $P_k$ may be assigned. For example, a group of SS sets containing a CSS may have higher priority than a group of SS sets containing USS and no CSS.

In aspects of the present disclosure, a UE may follow the below procedure in using a priority-based overbooking rule.

1) For a slot group of X slots, the UE determines the total number of slots for PDCCH monitoring, based on the configuration of search space sets. The UE may consider search space configuration parameters, e.g., periodicity, offset, duration, etc. in determining the PDCCH MOs and slots;

2) If the total number of slots for PDCCH monitoring exceeds $Y_{total}$, the groups of SS sets will be dropped one by one in ascending order of their priority index, until the remaining total number of slots for PDCCH monitoring is less than or equal to $Y_{total}$;

3) After group-based dropping (as described in 2)), for the remaining (e.g., not dropped) groups of SS sets, if the groups are served by the primary cell (PCell), SS set-based PDCCH overbooking (as defined in NR Rel-15) may be applied by the UE to reduce the number of monitored PDCCH candidates and CCEs to match the UE capability.

In some cases, the priority of a group may be dynamically changed, e.g., in response to an event. For example, within an RAR window (which may be considered an event), a group including Type 1 CSS may be prioritized over other groups, thus, the UE can receive a PDCCH with RA-RNTI without experiencing delays due to the UE dropping the group. In the example, the other groups may have higher priorities when the UE is not within the RAR window. In another example, during a paging occasion, a group including Type2 CSS may be prioritized over other groups. In yet another example, during a system information (SI) modification period (e.g., triggered by a PDCCH short message), a group including Type 0/0A CSS may be prioritized over other groups. In still another example, after beam failure recovery (BFR) is triggered by a UE, a group including the BFR SS set may be prioritized over other groups.

In aspects of the present disclosure, a prioritized group may not be dropped by the UE using group-based PDCCH overbooking.

Figure 8A:
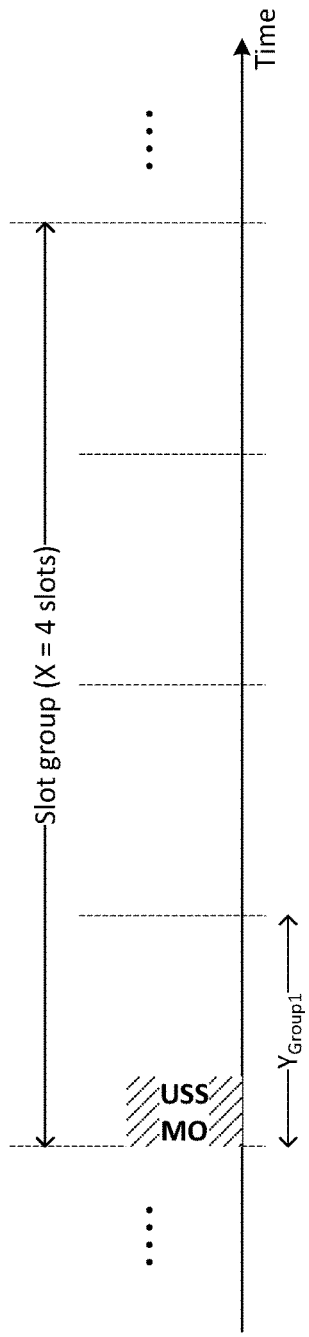
FIGS. 8A, 8B, and 8C illustrate examples of treatment of two groups of SS sets by a UE, in accordance with certain aspects of the present disclosure.
Figure 8B:
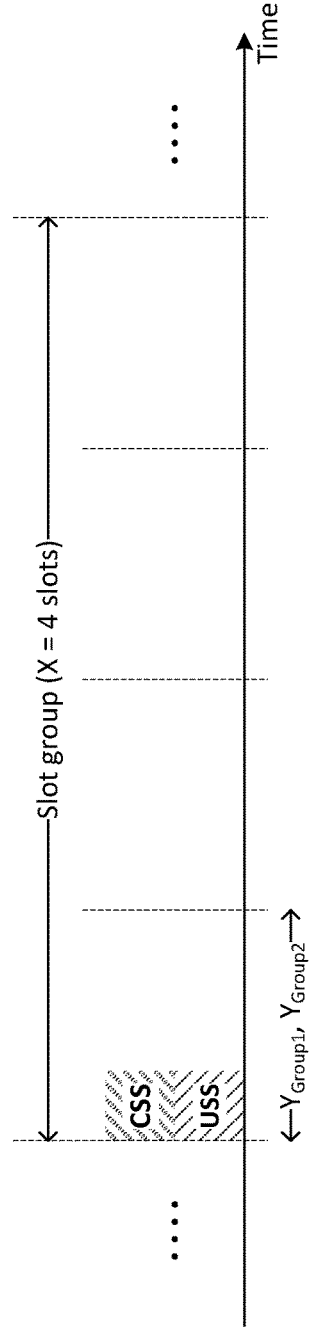
Figure 8C:
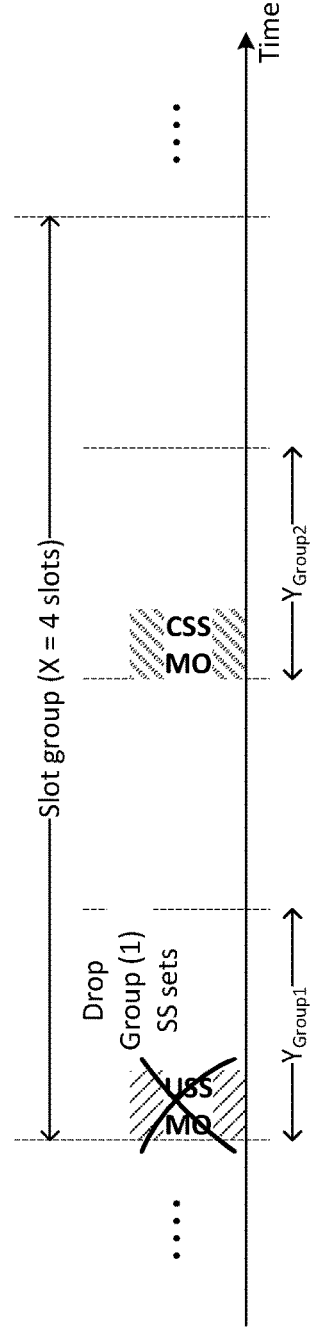

FIGS. 8A-8C illustrate examples 800, 830, 860 of treatment of two groups of SS sets (Group 1 and Group 2) by a UE (e.g., UE 104, shown in FIGS. 1-2) having capability $(Y_1, Y_2, Y_{total})=(1,1,1)$. In each of the examples 800, 830, and 860, group 2 has a higher priority than group 1. In the example 800 shown in FIG. 8A, only one group within the illustrated slot group. Since the total number of slots for PDCCH monitoring is less than or equal to $Y_{total}=1$, no dropping is applied. In the example 830 shown in FIG. 8B, two groups overlap in a same slot of the slot group. Since the total number of slots for PDCCH monitoring is less than or equal to $Y_{total}=1$, no dropping is applied by the UE. In the example 860 shown in FIG. 8C, two groups in the slot group do not overlap. Since the total number of slots for PDCCH monitoring is two, exceeding $Y_{total}=1$, a slot group with lower priority, i.e., Group 1, is dropped by the UE.

Example Methods

FIG. 9 is a flow diagram illustrating operations 900 that may be performed, for example, by a UE (e.g., UE 104, shown in FIGS. 1-2). The operations 900 may be implemented as software components that are executed and run on one or more processors (e.g., controller/processor 280 of FIG. 2). Further, the transmission of signals by the transmitter in operations 900 may be enabled, for example, by one or more antennas (e.g., antennas 252 of FIG. 2). In certain aspects, the transmission of signals by the transmitter may be implemented via a bus interface of one or more processors (e.g., controller/processor 280) outputting signals.

The operations 900 begin, at block 902, by determining a total number of slots for physical downlink control channel (PDCCH) monitoring for a slot group is larger than a maximum number of monitored slots for the UE for the slot group.

At block 904, operations 900 continue by, in response to the determination that the total number of slots for PDCCH monitoring is larger than the maximum number of monitored slots for the UE for the slot group, dropping a first group of search space (SS) sets, wherein the first group of SS sets is selected based on a priority of the first group of SS sets relative to other groups of SS sets.

In one aspect, operations 900 further include changing the priority of the first group of SS sets relative to the other groups of SS sets.

In one aspect, the first group of SS sets comprises a common search space (CSS) that includes random access responses (RARs). In one such aspect, changing the priority of the first group of SS sets includes making the first group of SS sets have a higher priority than the other groups of SS sets during a RAR window.

In one aspect, the first group of SS sets comprises a common search space (CSS) that includes paging messages. In one such aspect, changing the priority of the first group of SS sets includes making the first group of SS sets have a higher priority than the other groups of SS sets during a paging occasion (PO).

In one aspect, the first group of SS sets comprises a common search space (CSS) that includes short PDCCH messages. In one such aspect, changing the priority of the first group of SS sets includes making the first group of SS sets have a higher priority than the other groups of SS sets during a system information (SI) modification period.

In one aspect, the first group of SS sets comprises a beam failure recovery (BFR) SS. In one such aspect, changing the priority of the first group of SS sets comprises making the first group of SS sets have a higher priority than the other groups of SS sets after detecting a beam failure.

Figure 10:
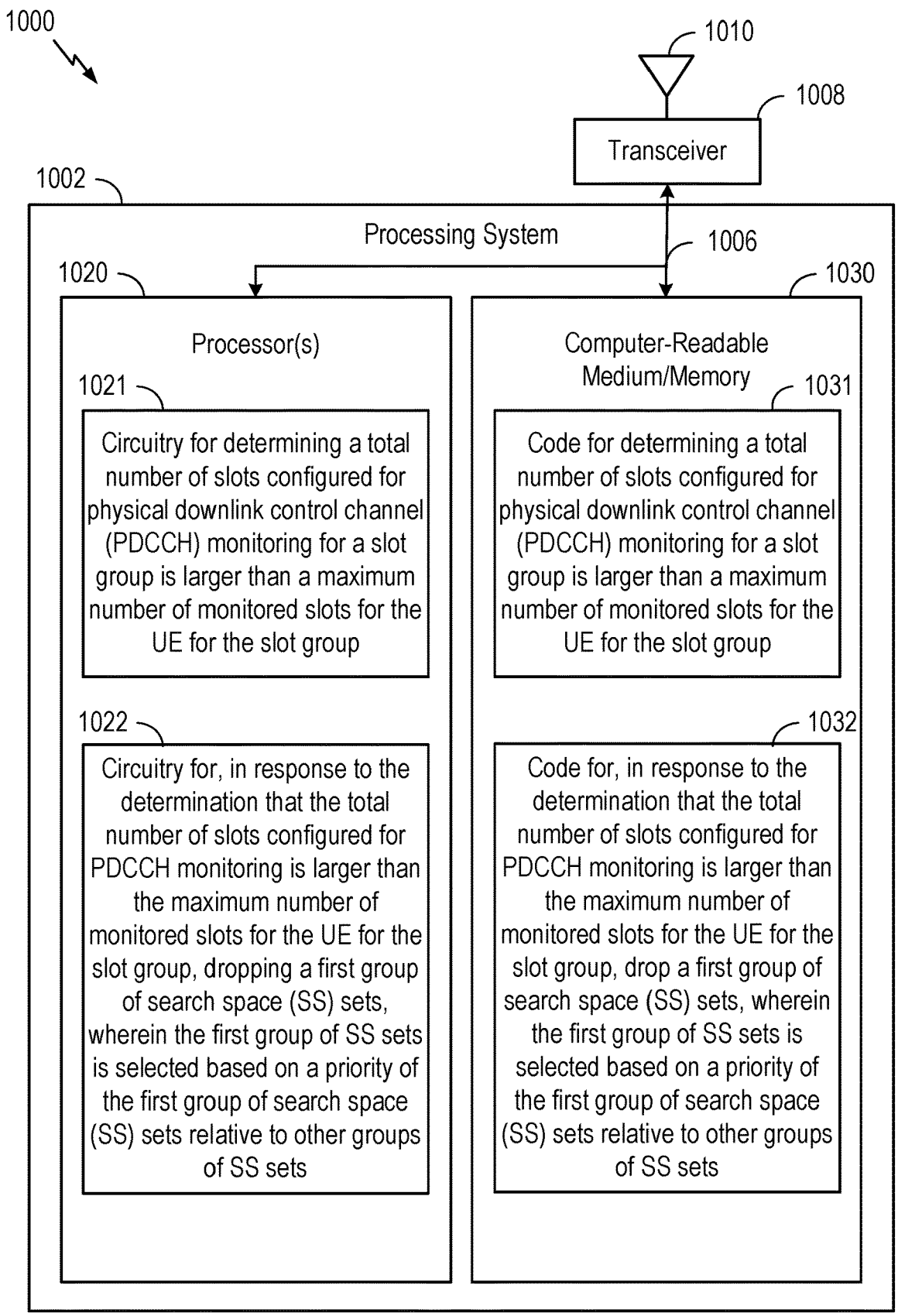
FIG. 10 depicts a device with example components capable of performing techniques described herein.

In one aspect, operations 900, or any aspect related to it, may be performed by an apparatus, such as communications device 1000 of FIG. 10, which includes various components operable, configured, or adapted to perform the operations 900. Communications device 1000 is described below in further detail.

Note that FIG. 9 is just one example of a method, and other methods including fewer, additional, or alternative steps are possible consistent with this disclosure.

Example Wireless Communication Devices

FIG. 10 depicts an example communications device 1000 that includes various components operable, configured, or adapted to perform operations for the techniques disclosed herein, such as the operations depicted and described with respect to FIG. 9. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIG. 9.

In the depicted example, computer-readable medium/memory 1030 stores code 1031 (e.g., an example of means for) for determining a total number of slots for physical downlink control channel (PDCCH) monitoring for a slot group is larger than a maximum number of monitored slots for the UE for the slot group; and code 1032 (e.g., an example of means for) for, in response to the determination that the total number of slots for PDCCH monitoring is larger than the maximum number of monitored slots for the UE for the slot group, drop a first group of search space (SS) sets, wherein the first group of SS sets is selected based on a priority of the first group of SS sets relative to other groups of SS sets.

In the depicted example, the one or more processors 1020 include circuitry configured to implement the code stored in the computer-readable medium/memory 1030, including circuitry 1021 (e.g., an example of means for) for determining a total number of slots for physical downlink control channel (PDCCH) monitoring for a slot group is larger than a maximum number of monitored slots for the UE for the slot group; and circuitry 1022 (e.g., an example of means for) for, in response to the determination that the total number of slots for PDCCH monitoring is larger than the maximum number of monitored slots for the UE for the slot group, drop a first group of search space (SS) sets, wherein the first group of SS sets is selected based on a priority of the first group of SS sets relative to other groups of SS sets.

Various components of communications device 1200 may provide means for performing the methods described herein, including with respect to FIG. 14.

In some examples, means for transmitting or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

Notably, FIG. 10 is just one example, and many other examples and configurations of communication device 1000 are possible.

Example Aspects

Implementation examples are described in the following numbered aspects:

Aspect 1: A method for wireless communications by a user equipment, comprising: determining a total number of slots for control channel monitoring for a slot group is larger than a maximum number of monitored slots for the UE for the slot group; and in response to the determination that the total number of slots for control channel monitoring is larger than the maximum number of monitored slots for the UE for the slot group, dropping a first group of search space (SS) sets, wherein the first group of SS sets is selected based on a priority of the first group of SS sets relative to other groups of SS sets.

Aspect 2: The method of Aspect 1, further comprising: determining, based on the first group of SS sets and other groups of SS sets, the total number of slots for PDCCH monitoring for the slot group.

Aspect 3: The method of Aspect 1, further comprising: dropping a second group of SS sets, wherein the second group of SS sets is selected based on a priority of the second group of SS sets relative to other groups of SS sets.

Aspect 4: The method of Aspect 1, further comprising: changing the priority of the first group of SS sets relative to the other groups of SS sets.

Aspect 5: The method of Aspect 4, wherein the first group of SS sets comprises a common search space (CSS) that includes random access responses (RARs), and changing the priority of the first group of SS sets comprises making the first group of SS sets have a higher priority than the other groups of SS sets during a RAR window.

Aspect 6: The method of Aspect 4, wherein the first group of SS sets comprises a common search space (CSS) that includes paging messages, and changing the priority of the first group of SS sets comprises making the first group of SS sets have a higher priority than the other groups of SS sets during a paging occasion (PO).

Aspect 7: The method of Aspect 4, wherein the first group of SS sets comprises a common search space (CSS) that includes short PDCCH messages and changing the priority of the first group of SS sets comprises making the first group of SS sets have a higher priority than the other groups of SS sets during a system information (SI) modification period.

Aspect 8: The method of Aspect 4, wherein the first group of SS sets comprises a beam failure recovery (BFR) SS and changing the priority of the first group of SS sets comprises making the first group of SS sets have a higher priority than the other groups of SS sets after detecting a beam failure.

Aspect 9: An apparatus, comprising means for performing a method in accordance with any one of Aspects 1-8.

Aspect 10: A non-transitory computer-readable medium comprising executable instructions that, when executed by a processor of an apparatus, cause the apparatus to perform a method in accordance with any one of Aspects 1-8.

Aspect 11: A computer program product embodied on a computer-readable storage medium comprising code for performing a method in accordance with any one of Aspects 1-8.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3 GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. The gNB 180 may also communicate with one or more UEs 104 via a beam formed connection 182 (e.g., via beams 182' and 182").

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink (SL) channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of NR and LTE sidelink co-channel co-existence in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95, and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more computer-executable instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), the method comprising:
    obtaining a configuration of at least one slot group, wherein the slot group includes a plurality of consecutive slots within a subframe;
    obtaining a configuration of one or more groups of search space (SS) sets including at least a first group of SS sets, each group of SS sets including one or more SS sets, and each group of SS sets being associated with a priority level;
    determining, based on the configuration of the one or more groups of SS sets, a total number of slots configured for physical downlink control channel (PDCCH) monitoring in the slot group;
    determining the total number of slots configured for PDCCH monitoring for the slot group is larger than a maximum number of monitored slots for the UE for the slot group; and
    in response to the determination that the total number of slots configured for PDCCH monitoring in the slot group is larger than the maximum number of monitored slots for the UE for the slot group, dropping the first group of the one or more groups of SS sets, wherein the first group of SS sets is selected based on the associated priority level of the first group of SS sets relative to the associated priority levels other groups of the one or more groups of SS set.

2. The method of claim 1, wherein the one or more groups of SS sets includes a plurality of groups of SS sets, further comprising:
    determining, after dropping the first group of SS sets, a second total number of slots configured for PDCCH monitoring for the slot group;
    determining the second total number of slots configured for PDCCH monitoring for the slot group is larger than a maximum number of monitored slots for the UE for the slot group; and
    dropping a second group of the plurality of groups of SS sets, wherein the second group of SS sets is selected based on the associated priority level of the second group of SS sets relative to the associated priority levels of the other groups of the plurality of groups of SS sets.

3. The method of claim 1, further comprising changing the associated priority level of the first group of SS sets relative to the associated priority levels of the other groups of SS sets.

4. The method of claim 3, wherein:
the first group of SS sets comprises a common search space (CSS) that includes random access responses (RARs); and
changing the associated priority level of the first group of SS sets comprises associating the first group of SS sets with a higher priority level than the associated priority levels of the other groups of SS sets during a RAR window.

5. The method of claim 3, wherein:
the first group of SS sets comprises a common search space (CSS) that includes paging messages; and
changing the associated priority level of the first group of SS sets comprises associating the first group of SS sets with a higher priority level than the associated priority levels of the other groups of SS sets during a paging occasion (PO).

6. The method of claim 3, wherein:
the first group of SS sets comprises a common search space (CSS) that includes short PDCCH messages; and
changing the associated priority level of the first group of SS sets comprises associating the first group of SS sets with a higher priority level than the associated priority levels of the other groups of SS sets during a system information (SI) modification period.

7. The method of claim 4, wherein:
the first group of SS sets comprises a beam failure recovery (BFR) SS; and
changing the associated priority level of the first group of SS sets comprises associating the first group of SS sets with a higher priority level than the associated priority levels of the other groups of SS sets after detecting a beam failure.

8. A user equipment (UE) configured for wireless communications, the user UE comprising:
a memory comprising computer-executable instructions; and
a processor configured to execute the computer-executable instructions and cause the UE to:
obtain a configuration of at least one slot group, wherein the slot group includes a plurality of consecutive slots within a subframe;
obtain a configuration of one or more groups of search space (SS) sets including at least a first group of SS sets, each group of SS sets including one or more SS sets, and each group of SS sets being associated with a priority level;
determine, based on the configuration of the one or more groups of SS sets, a total number of slots configured for physical downlink control channel (PDCCH) monitoring in the slot group;
determine the total number of slots configured for PDCCH monitoring for the slot group is larger than a maximum number of monitored slots for the UE for the slot group; and
in response to the determination that the total number of slots configured for PDCCH monitoring in the slot group is larger than the maximum number of monitored slots for the UE for the slot group, drop the first group of the one or more groups of SS sets, wherein the first group of SS sets is selected based on the associated priority level of the first group of SS sets relative to the associated priority levels other groups of the one or more groups of SS set.

9. The UE of claim 8, wherein:
the one or more groups of SS sets includes a plurality of groups of SS sets;
the processor is configured to execute the computer-executable instructions and further cause the UE to:
determine, after dropping the first group of SS sets, a second total number of slots configured for PDCCH monitoring for the slot group;
determine the second total number of slots configured for PDCCH monitoring for the slot group is larger than a maximum number of monitored slots for the UE for the slot group; and
drop a second group of the plurality of groups of SS sets; and
the second group of SS sets is selected based on the associated priority level of the second group of SS sets relative to the associated priority levels of the other groups of the plurality of groups of SS sets.

10. The UE of claim 8, wherein the processor is configured to execute the computer-executable instructions and further cause the UE to change the associated priority level of the first group of SS sets relative to the associated priority levels of the other groups of SS sets.

11. The UE of claim 10, wherein:
the first group of SS sets comprises a common search space (CSS) that includes random access responses (RARs); and
the processor being configured to execute the computer-executable instructions to change the associated priority level of the first group of SS sets comprises the processor being configured to execute the computer-executable instructions to associate the first group of SS sets with a higher priority level than the associated priority levels of the other groups of SS sets during a RAR window.

12. The UE of claim 10, wherein:
the first group of SS sets comprises a common search space (CSS) that includes paging messages; and
the processor being configured to execute the computer-executable instructions to change the associated priority level of the first group of SS sets comprises the processor being configured to execute the computer-executable instructions to associate the first group of SS sets with a higher priority level than the associated priority levels of the other groups of SS sets during a paging occasion (PO).

13. The UE of claim 10, wherein:
the first group of SS sets comprises a common search space (CSS) that includes short PDCCH messages; and
the processor being configured to execute the computer-executable instructions to change the associated priority level of the first group of SS sets comprises the processor being configured to execute the computer-executable instructions to associate the first group of SS sets with a higher priority level than the associated priority levels of the other groups of SS sets during a system information (SI) modification period.

14. The UE of claim 10, wherein:
the first group of SS sets comprises a beam failure recovery (BFR) SS; and
the processor being configured to execute the computer-executable instructions to change the associated priority level of the first group of SS sets comprises the processor being configured to execute the computer-executable instructions to associate the first group of SS sets with a higher priority level than the associated priority levels of the other groups of SS sets after detecting a beam failure.

15. A non-transitory computer-readable medium comprising computer-executable instructions that, when executed by a processor of a user equipment (UE), cause the UE to perform a method of wireless communications, the method comprising:
obtaining a configuration of at least one slot group, wherein the slot group includes a plurality of consecutive slots within a subframe;
obtaining a configuration of one or more groups of search space (SS) sets including at least a first group of SS sets, each group of SS sets including one or more SS sets, and each group of SS sets being associated with a priority level;
determining, based on the configuration of the one or more groups of SS sets, a total number of slots configured for physical downlink control channel (PDCCH) monitoring in the slot group;
determining the total number of slots configured for PDCCH monitoring for the slot group is larger than a maximum number of monitored slots for the UE for the slot group; and
in response to the determination that the total number of slots configured for PDCCH monitoring in the slot group is larger than the maximum number of monitored slots for the UE for the slot group, dropping the first group of the one or more groups of SS sets, wherein the first group of SS sets is selected based on the associated priority level of the first group of SS sets relative to the associated priority levels other groups of the one or more groups of SS set.

16. The non-transitory computer-readable medium of claim 15, wherein:
the one or more groups of SS sets includes a plurality of groups of SS sets;
the method further comprises:
determining, after dropping the first group of SS sets, a second total number of slots configured for PDCCH monitoring for the slot group;
determining the second total number of slots configured for PDCCH monitoring for the slot group is larger than a maximum number of monitored slots for the UE for the slot group; and
dropping a second group of the plurality of groups of SS sets; and
the second group of SS sets is selected based on the associated priority level of the second group of SS sets relative to the associated priority levels of the other groups of the plurality of groups of SS sets.

17. The non-transitory computer-readable medium of claim 15, wherein the method further comprises changing the associated priority level of the first group of SS sets relative to the associated priority levels of the other groups of SS sets.

18. The non-transitory computer-readable medium of claim 17, wherein:
the first group of SS sets comprises a common search space (CSS) that includes random access responses (RARs); and
changing the associated priority level of the first group of SS sets comprises associated the first group of SS sets with a higher priority level than the associated priority levels of the other groups of SS sets during a RAR window.

19. The non-transitory computer-readable medium of claim 17, wherein:
the first group of SS sets comprises a common search space (CSS) that includes paging messages; and
changing the associated priority level of the first group of SS sets comprises associated the first group of SS sets with a higher priority level than the associated priority levels of the other groups of SS sets during a paging occasion (PO).

20. The non-transitory computer-readable medium of claim 17, wherein:
the first group of SS sets comprises a common search space (CSS) that includes short PDCCH messages; and
changing the associated priority level of the first group of SS sets comprises associating the first group of SS sets with a higher priority level than the associated priority levels of the other groups of SS sets during a system information (SI) modification period.

21. The non-transitory computer-readable medium of claim 17, wherein:
the first group of SS sets comprises a beam failure recovery (BFR) SS; and
changing the associated priority level of the first group of SS sets comprises associating the first group of SS sets with a higher priority level than the associated priority levels of the other groups of SS sets after detecting a beam failure.

22. An apparatus for wireless communications, the apparatus comprising:
means for obtaining a configuration of at least one slot group, wherein the slot group includes a plurality of consecutive slots within a subframe;
means for obtaining a configuration of one or more groups of search space (SS) sets including at least a first group of SS sets, each group of SS sets including one or more SS sets, and each group of SS sets being associated with a priority level;
means for determining, based on the configuration of the one or more groups of SS sets, a total number of slots configured for physical downlink control channel (PDCCH) monitoring in the slot group;
means for determining the total number of slots configured for PDCCH monitoring for the slot group is larger than a maximum number of monitored slots for the apparatus for the slot group; and
means for dropping the first group of the one or more groups of SS sets in response to the determination that the total number of slots configured for PDCCH monitoring in the slot group is larger than the maximum number of monitored slots for the apparatus for the slot group, wherein the first group of SS sets is selected based on the associated priority level of the first group of SS sets relative to the associated priority levels other groups of the one or more groups of SS set.

23. The apparatus of claim 22, wherein the one or more groups of SS sets includes a plurality of groups of SS sets, further comprising:
means for determining, after dropping the first group of SS sets, a second total number of slots configured for PDCCH monitoring for the slot group;
means for determining the second total number of slots configured for PDCCH monitoring for the slot group is larger than a maximum number of monitored slots for the UE for the slot group; and
means for dropping a second group of the plurality of groups of SS sets, wherein the second group of SS sets is selected based on the associated priority level of the second group of SS sets relative to the associated priority levels of the other groups of the plurality of groups of SS sets.

24. The apparatus of claim 22, further comprising means for changing the associated priority level of the first group of SS sets relative to the associated priority levels of the other groups of SS sets.

25. The apparatus of claim 24, wherein:
the first group of SS sets comprises a common search space (CSS) that includes random access responses (RARs); and
the means for changing the associated priority level of the first group of SS sets comprises means for associating the first group of SS sets with a higher priority level than the associated priority levels of the other groups of SS sets during a RAR.

26. The apparatus of claim 24, wherein:
the first group of SS sets comprises a common search space (CSS) that includes paging messages; and
the means for changing the associated priority level of the first group of SS sets comprises means for associating the first group of SS sets with a higher priority level than the associated priority levels of the other groups of SS sets during a paging occasion (PO).

* * * * *